(12) United States Patent
Kadous (10) Patent No.: US 7,194,041 B2
(45) Date of Patent: *Mar. 20, 2007

(54) ORDERED SUCCESSIVE INTERFERENCE CANCELLATION RECEIVER PROCESSING FOR MULTIPATH CHANNELS

(75) Inventor: Tamer Kadous, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/917,079

(22) Filed: Aug. 11, 2004

(65) Prior Publication Data

US 2005/0008092 A1 Jan. 13, 2005

Related U.S. Application Data

(63) Continuation of application No. 10/120,966, filed on Apr. 9, 2002, now Pat. No. 6,801,580.

(51) Int. Cl.
*H04L 1/06* (2006.01)
*H04B 7/08* (2006.01)

(52) U.S. Cl. .................. 375/267; 375/260; 375/347

(58) Field of Classification Search ............... 375/144, 375/148, 225, 227, 260, 267, 347, 349; 370/203, 370/208, 210; 455/500, 67.11, 67.13
See application file for complete search history.

(56) References Cited

U.S. PATENT DOCUMENTS

| | | | | |
|---|---|---|---|---|
| 6,031,874 A | * | 2/2000 | Chennakeshu et al. | 375/262 |
| 6,101,168 A | * | 8/2000 | Chen et al. | 370/228 |
| 6,144,711 A | * | 11/2000 | Raleigh et al. | 375/347 |
| 6,314,147 B1 | * | 11/2001 | Liang et al. | 375/346 |
| 6,442,130 B1 | * | 8/2002 | Jones et al. | 370/208 |
| 6,449,246 B1 | * | 9/2002 | Barton et al. | 370/210 |
| 6,785,341 B2 | | 8/2004 | Walton et al. | |
| 7,054,378 B2 | | 5/2006 | Walton et al. | |
| 2002/0003833 A1 | * | 1/2002 | Usuda et al. | 375/144 |
| 2002/0122383 A1 | * | 9/2002 | Wu et al. | 370/210 |
| 2002/0196842 A1 | * | 12/2002 | Onggosanusi et al. | 375/148 |
| 2003/0072254 A1 | * | 4/2003 | Ma et al. | 370/208 |
| 2003/0072395 A1 | * | 4/2003 | Jia et al. | 375/341 |
| 2003/0103584 A1 | * | 6/2003 | Bjerke et al. | 375/340 |
| 2003/0161282 A1 | * | 8/2003 | Medvedev et al. | 370/329 |

\* cited by examiner

*Primary Examiner*—Young T. Tse
(74) *Attorney, Agent, or Firm*—Thomas R. Rouse; Sandip (Micky) S. Minhas; Dmitry R. Milikovsky (57) ABSTRACT

Techniques to process a number of "received" symbol streams in a Multiple-Input Multiple-Output (MIMO) system with multipath channels such that improved performance may be achieved when using successive interference cancellation (SIC) processing. In an aspect, metrics indicative of the quality or "goodness" of a "detected" symbol stream are provided. These metrics consider the frequency selective response of the multipath channels used to transmit the symbol stream. For example, the metrics may relate to (1) an overall channel capacity for all transmission channels used for the symbol stream, or (2) an equivalent signal-to-interference noise ratio (SNR) of an Additive White Gaussian Noise (AWGN) channel modeling these transmission channels. In another aspect, techniques are provided to process the received symbol streams, using SIC processing, to recover a number of transmitted symbol streams. The particular order in which the symbol streams are recovered is determined based on the metrics determined for symbol streams detected at each SIC processing stage.

43 Claims, 6 Drawing Sheets

400
ORDERED SUCCESSIVE INTERFERENCE CANCELLATION RECEIVER PROCESSING FOR MULTIPATH CHANNELS

CROSS-REFERENCE TO RELATED APPLICATIONS

This Application is a continuation of application Ser. No. 10/120,966, filed Apr. 9, 2002, now U.S. Pat. No. 6,801,580 B2.

BACKGROUND

1. Field

The present invention relates generally to data communication, and more specifically to techniques for performing successive interference cancellation (SIC) processing at a receiver of a multiple-input multiple-output (MIMO) communication system with multipath channels.

2. Background

In a wireless communication system, an RF modulated signal from a transmitter may reach a receiver via a number of propagation paths. The characteristics of the propagation paths typically vary over time due to a number of factors such as fading and multipath. To provide diversity against deleterious path effects and improve performance, multiple transmit and receive antennas may be used. If the propagation paths between the transmit and receive antennas are linearly independent (i.e., a transmission on one path is not formed as a linear combination of the transmissions on the other paths), which is generally true to at least an extent, then the likelihood of correctly receiving a data transmission increases as the number of antennas increases. Generally, diversity increases and performance improves as the number of transmit and receive antennas increases.

A multiple-input multiple-output (MIMO) communication system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, with $N_S \leq \min\{N_T, N_R\}$. Each of the $N_S$ independent channels may also be referred to as a spatial subchannel of the MIMO channel and corresponds to a dimension. The MIMO system can provide improved performance (e.g., increased transmission capacity) if the additional dimensionalities created by the multiple transmit and receive antennas are utilized.

For a full-rank MIMO channel, with $N_S = N_T \leq N_R$, $N_T$ independent data streams may be processed to provide $N_T$ corresponding symbol streams, which may then be transmitted from the $N_T$ transmit antennas. The transmitted symbol streams may experience different channel conditions (e.g., different fading and multipath effects) and may achieve different "received" signal-to-noise-and-interference ratios (SNRs) for a given amount of transmit power.

A successive interference cancellation (SIC) processing technique may be employed at the receiver to process $N_R$ received symbol streams from the $N_R$ receive antennas to recover the $N_T$ transmitted symbol streams. A SIC receiver successively processes the received symbol streams to recover one transmitted symbol stream at a time. For each stage of the SIC receiver, spatial or space-time processing is initially performed on the received symbol streams to provide a number of "detected" symbol streams, which are estimates of the transmitted symbol streams. One of the detected symbol streams is then selected for recovery, and this symbol stream is further processed to obtain a corresponding decoded data stream, which is an estimate of the transmitted data stream corresponding to the symbol stream being recovered. Each recovered symbol stream (i.e., each detected symbol stream that is processed to recover the transmitted data) is associated with a particular "post-detection" SNR, which is the SNR achieved after the spatial or space-time processing to separate out this symbol stream. With SIC processing, the post-detection SNR of each recovered symbol stream is dependent on that stream's received SNR and the particular stage at which the symbol stream was recovered. The post-detection SNR of the recovered symbol stream determines the likelihood of correctly decoding the symbol stream to obtain the corresponding data stream.

To improve performance, the transmitted symbol streams need to be recovered in a particular order such that the likelihood of correctly recovering all transmitted symbol streams is maximized. This goal is made challenging for multipath channels that experience frequency selective fading, which is characterized by different amounts of attenuation across the system bandwidth. For a multipath channel, the post-detection SNR varies across the system bandwidth. In this case, some metrics other than post-detection SNR would need to be derived and used to select the order for recovering the transmitted symbol streams.

There is therefore a need in the art for techniques to process multiple received symbol streams, using SIC processing, to recover multiple transmitted symbol streams in a particular order such that improved performance may be attained.

SUMMARY

Techniques are provided herein to process a number of received symbol streams in a MIMO system with multipath channels such that improved performance may be achieved when using successive interference cancellation (SIC) receiver processing. In an aspect, metrics indicative of the quality or "goodness" of a detected symbol stream are provided. These metrics consider the frequency selective response of the multipath channels used to transmit the symbol stream. In another aspect, techniques are provided to process the received symbol streams, using SIC processing, to recover a number of transmitted symbol streams. The order in which the transmitted symbol streams are recovered is determined based on the metrics determined for the detected symbol streams at each stage of the SIC processing.

In a specific embodiment, a method is provided for deriving a metric indicative of a received quality of a symbol stream transmitted via a multipath channel in a MIMO system. In accordance with the method, a post-detection SNR is estimated for each of a number of frequency bins used to transmit the symbol stream. The channel capacity of each frequency bin is then determined based on the post-detection SNR and an unconstrained or constrained capacity function. The channel capacities of all frequency bins are then accumulated to obtain an overall channel capacity. An equivalent SNR for an Additive White Gaussian Noise (AWGN) channel may also be determined based on the overall channel capacity and an inverse capacity function. The overall channel capacity and the equivalent SNR are both indicative of the received quality of the symbol stream. The metric may be used to select a specific symbol stream for recovery at each stage of a SIC receiver.

In another specific embodiment, a method is provided for processing a number of received symbol streams to recover a number of transmitted symbol streams in a MIMO system with multipath channels. In accordance with the method, the received symbol streams are processed to provide a number of detected symbol streams. A metric is then determined for each detected symbol stream. The metric considers the frequency selective response of one or more transmission channels (e.g., frequency bins) used to transmit the detected symbol stream, and may be defined as the overall channel capacity or the equivalent SNR. The detected symbol stream associated with the best metric is then selected for recovery (i.e., further processed to obtain a decoded data stream). A number of modified symbol streams, which have the estimated interference due to the recovered symbol stream approximately removed, may then be derived and further processed in similar manner to recover another symbol stream.

Various aspects and embodiments of the invention are described in further detail below. The invention further provides methods, processors, transmitter units, receiver units, base stations, terminals, systems, and other apparatuses and elements that implement various aspects, embodiments, and features of the invention, as described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

The techniques described herein for processing a number of received symbol streams, using successive interference cancellation (SIC) processing, to recover a number of transmitted symbol streams may be implemented in various multi-channel communication systems. Such multi-channel communication systems include multiple-input multiple-output (MIMO) communication systems, orthogonal frequency division multiplexing (OFDM) communication systems, MIMO systems that employ OFDM (i.e., MIMO-OFDM systems), and so on. For clarity, various aspects and embodiments of the techniques are described specifically for a MIMO-OFDM system.

A MIMO system employs multiple ($N_T$) transmit antennas and multiple ($N_R$) receive antennas for data transmission, and is denoted as an ($N_T$, $N_R$) system. A MIMO channel formed by the $N_T$ transmit and $N_R$ receive antennas may be decomposed into $N_S$ independent channels, with $N_S \leq \min$ {$N_T$, $N_R$}. Each of the $N_S$ independent channels may also be referred to as a spatial subchannel of the MIMO channel.

A wideband MIMO system may experience frequency selective fading, which is characterized by different amounts of attenuation across the system bandwidth. This frequency selective fading causes inter-symbol interference (ISI), which is a phenomenon whereby each symbol in a received signal acts as distortion to subsequent symbols in the received signal. This distortion degrades performance by impacting the ability to correctly detect the received symbols.

OFDM may be used to combat ISI and/or for some other considerations. An OFDM system effectively partitions the overall system bandwidth into a number of ($N_F$) frequency subchannels, which may also be referred to as frequency bins or subbands. Each frequency subchannel is associated with a respective subcarrier (or tone) on which data may be modulated. The frequency subchannels of the OFDM system may also experience frequency selective fading, depending on the characteristics (e.g., the multipath profile) of the propagation path between the transmit and receive antennas. With OFDM, the ISI due to frequency selective fading may be combated by repeating a portion of each OFDM symbol (i.e., appending a cyclic prefix to each OFDM symbol), as is known in the art.

For a MIMO-OFDM system, $N_F$ frequency subchannels are available on each of the $N_S$ spatial subchannels for data transmission. Each frequency subchannel of each spatial subchannel may be referred to as a transmission channel. $N_F \cdot N_S$ transmission channels are then available in the MIMO-OFDM system for data transmission between the $N_T$ transmit and $N_R$ receive antennas.

For simplicity, the following description assumes that one "independent" data stream is transmitted on all $N_F$ frequency subchannels from each transmit antenna. Each such data stream is independently processed (e.g., coded, interleaved, and symbol mapped) at the transmitter and may thus be independently recovered at the receiver.

Figure 1:
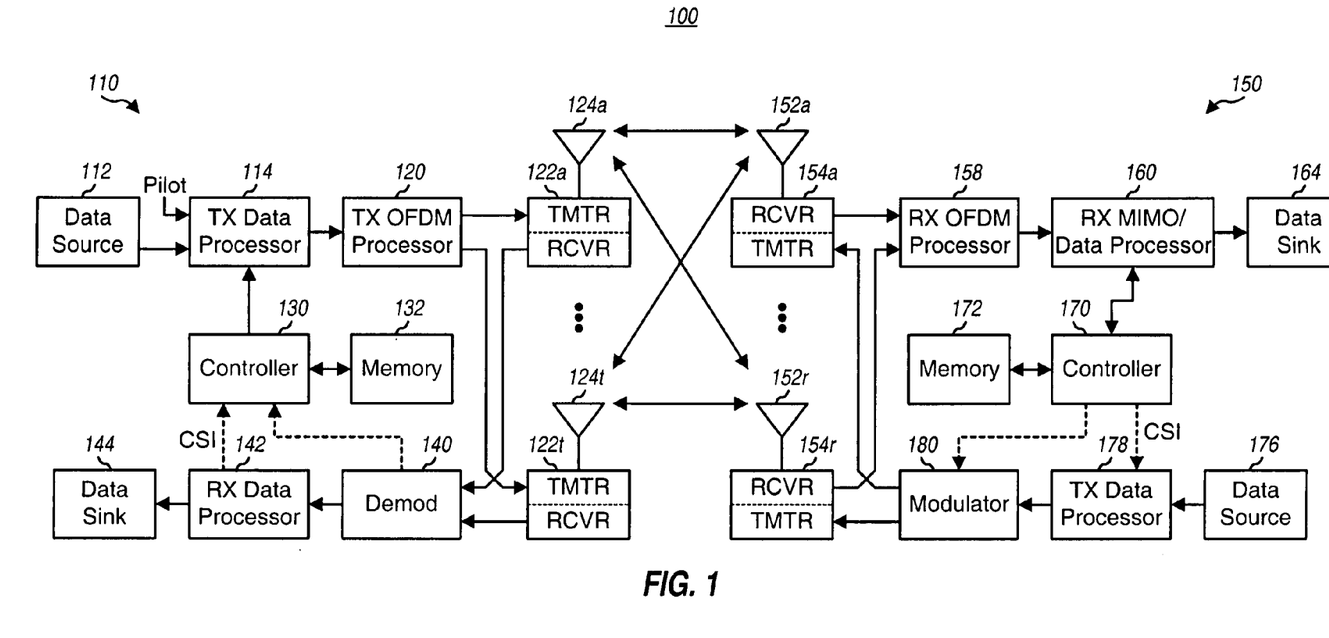
FIG. 1 is a block diagram of an embodiment of a transmitter system and a receiver system in a MIMO-OFDM system.

FIG. 1 is a block diagram of an embodiment of a transmitter system 110 and a receiver system 150 in a MIMO system 100. Transmitter system 110 and receiver system 150 may each be implemented in an access point and/or an access terminal in the MIMO system.

At transmitter system 110, traffic data for a number of data streams is provided from a data source 112 to a transmit (TX) data processor 114. In an embodiment, each data stream is transmitted over a respective transmit antenna. TX data processor 114 formats, codes, and interleaves the traffic data for each data stream, based on a particular coding scheme selected for that data stream, to provide coded data.

The coded data for each data stream maybe multiplexed with pilot data using, for example, time division multiplexing (TDM) or code division multiplexing (CDM). The pilot data is typically a known data pattern that is processed in a known manner (if at all), and may be used at the receiver system to estimate the channel response. The multiplexed pilot and coded data for each data stream is then modulated (i.e., symbol mapped), based on one or more modulation schemes (e.g., BPSK, QPSK, M-PSK, or M-QAM) selected for that data stream, to provide modulation symbols. The data rate, coding, and modulation for each data stream may be determined by controls provided by a controller 130.

The modulation symbols for all data streams are then provided to a TX OFDM processor 120, which further performs OFDM processing on the modulation symbols. OFDM processor 120 then provides $N_T$ transmission symbol streams to $N_T$ transmitters (TMTR) 122a through 122t. Each transmitter 122 receives and processes a respective transmission symbol stream to provide one or more analog signals, and further conditions (e.g., amplifies, filters, and upconverts) the analog signals to provide a modulated signal suitable for transmission over the MIMO channel. $N_T$ modulated signals from transmitters 122a through 122t are then transmitted from $N_T$ antennas 124a through 124t, respectively.

At receiver system 150, the transmitted modulated signals are received by $N_R$ antennas 152a through 152r, and the received signal from each antenna 152 is provided to a respective receiver (RCVR) 154 (which may also be referred to as a "front-end" unit). Each receiver 154 conditions (e.g., filters, amplifies, and downconverts) a respective received signal, digitizes the conditioned signal to provide samples, and further processes the samples to provide a respective stream of received transmission symbols. An RX OFDM processor 158 then performs the complementary OFDM processing on each received transmission symbol stream to provide a corresponding "received" symbol stream. The received symbol stream for each receive antenna comprises a combination of $N_T$ transmitted symbol streams, which are weighted by the complex channel gains between the $N_T$ transmit antennas and that receive antenna.

An RX MIMO/data processor 160 then receives and processes the $N_R$ received symbol streams from RX OFDM processor 158, using successive interference cancellation processing, to provide $N_T$ decoded data streams. The processing by RX MIMO/data processor 160 is described in further detail below. In general, the processing by RX MIMO/data processor 160 is complementary to that performed by TX data processor 114 at transmitter system 110.

RX MIMO processor 160 may derive an estimate of the channel response between the $N_T$ transmit and $N_R$ receive antennas for the $N_F$ frequency subchannels (e.g., based on the pilot multiplexed with the traffic data). The channel response estimate may be used to perform spatial or space-time processing within processor 160. RX MIMO processor 160 may further estimate the signal-to-noise-and-interference ratios (SNRs) of the frequency subchannels used for each symbol stream, and possibly other channel characteristics, and provide these quantities to a controller 170. Controller 170 may provide channel state information (CSI), which may comprise various types of information regarding the communication link and/or the symbol streams. For example, the CSI may comprise an "operating" SNR for the MIMO-OFDM system, which is indicative of the overall conditions of the communication link. The CSI (if it is to be reported) is processed by a TX data processor 178, modulated by a modulator 180, conditioned by transmitters 154a through 154r, and transmitted back to transmitter system 110.

At transmitter system 110, the modulated signals from receiver system 150 are received by antennas 124, conditioned by receivers 122, demodulated by a demodulator 140, and processed by a RX data processor 142 to recover the CSI (if any) reported by the receiver system. The reported CSI is then provided to controller 130 and may be used to (1) determine the coding and modulation schemes (and also possibly the data rates) to be used for the data streams and (2) generate various controls for TX data processor 114.

Controllers 130 and 170 direct the operation at the transmitter and receiver systems, respectively. Memories 132 and 172 provide storage for program codes and data used by controllers 130 and 170, respectively.

For a MIMO-OFDM system, the response between the $N_T$ transmit and $N_R$ receive antennas may be described by an $N_R \times N_T$ channel impulse response matrix, $\underline{H}$. The elements of the matrix $\underline{H}$ are composed of channel impulse vectors $\{\underline{h}_{i,j}\}$, for $i=1, 2, \ldots N_R$ and $j=1, 2, \ldots N_T$, where $\underline{h}_{i,j}$ describes the coupling between the j-th transmit antenna and the i-th receive antenna. The vector $\underline{h}_{i,j}$ is composed of L taps and may be expressed as:

$$\underline{h}_{i,j} = [h_{i,j}(1)\ h_{i,j}(2) \ldots h_{i,j}(L)]^T, \qquad \text{Eq (1)}$$

where each of the L tap is modeled as a complex Gaussian coefficient. For a given (i,j) transmit-receive antenna pair, the signal transmitted from the j-th transmit antenna may be received by the i-th receive antenna via a number of propagation paths, and the multipath components associated with these propagation paths are assumed to be uncorrelated. This may be expressed as:

$$E[h_{i,j}(p)h^*_{i,j}(q)] = E[|h_{i,j}(p)|^2]\delta_{p-q}, \qquad \text{Eq (2)}$$

where p and q represent two multipath components, h* is the complex conjugate of h, and $\delta_{p-q}$ is the Delta-Dirac function that is equal 1 only if p=q and zero otherwise. Furthermore, it is assumed that the channel responses for different transmit-receive antenna pairs are uncorrelated, i.e., $E[\underline{h}_{m,n} \underline{h}_{i,j}^H]=0$, for different values of m, n, i, and j, where $\underline{h}^H$ represents the conjugate transpose of $\underline{h}$.

The channel impulse response matrix, $\underline{H}(n)$, is a time-domain representation of the MIMO channel response. A corresponding channel frequency response matrix, $\underline{H}(k)$, may be obtained by performing a fast Fourier transform (FFT) on $\underline{H}(n)$, which may be expressed as:

$$\underline{H}(k) = FFT[\underline{H}(n)], \qquad \text{Eq(3)}$$

where $k=0, 1, \ldots (N_F-1)$ and $N_F \geq L$. In particular, an $N_F$-point FFT may be performed on a sequence of $N_F$ sampled values for a given element of $\underline{H}$ to derive a sequence of $N_F$ coefficients for the corresponding element of $\underline{H}$. Each element of $\underline{H}$ is thus the FFT of a corresponding element of $\underline{H}$. Each element of $\underline{H}$ is a vector of $N_F$ complex values (i.e., $\underline{h}_{i,j} = [h_{i,j}(0)\ h_{i,j}(1) \ldots h_{i,j}(N_F-1)]^T$), which are representative of the frequency response of the propagation path for a particular (i,j) transmit-receive antenna pair. The matrix $\underline{H}$ may thus be viewed as comprising a sequence of $N_F$ matrixes $\underline{H}(k)$, for $k=0, 1, \ldots (N_F-1)$, each of dimension $N_R \times N_T$.

The model for the MIMO-OFDM system may be expressed as:

$$\underline{y}(k) = \underline{H}(k)\underline{x}(k) + \underline{n}, \text{ for } k=0, 1, \ldots (N_F-1), \qquad \text{Eq (4)}$$

where $\underline{y}(k)$ is a vector of $N_R$ received symbols for the k-th frequency subchannel (i.e., the "received" vector for tone k), which may be represented as $\underline{y}(k) = [y_1(k)\ y_2(k) \ldots y_{N_R}(k)]^T$, where $y_i(k)$ is the entry received by the i-th received antenna for tone k and $i \in \{1, \ldots, N_R\}$;

$\underline{x}(k)$ is a vector of $N_T$ modulation symbols for tone k (i.e., the "transmitted" vector), which may be represented as $\underline{x}(k) = [x_1(k)\ x_2(k) \ldots x_{N_T}(k)]^T$, where $x_j(k)$ is the modulation symbol transmitted from the j-th transmit antenna for tone k and $j \in \{1, \ldots, N_T\}$;

$\underline{H}(k)$ is the channel frequency response matrix for the MIMO channel for tone k; and $\underline{n}$ is the additive white Gaussian noise (AWGN) with a mean vector of $\underline{0}$ and a covariance matrix of $\Lambda_n = \sigma^2 \underline{I}$, where $\underline{0}$ is a vector of zeros, $\underline{I}$ is the identity matrix with ones along the diagonal and zeros everywhere else, and $\sigma^2$ is the variance of the noise.

For simplicity, the effects of the OFDM processing at both the transmitter and receiver (which may be negligible) are not shown in equation (4).

Due to scattering in the propagation environment, the $N_T$ symbol streams transmitted from the $N_T$ transmit antennas interfere with each other at the receiver. In particular, a given symbol stream transmitted from one transmit antenna may be received by all $N_R$ receive antennas at different amplitudes and phases. Each received symbol stream may then include a component of each of the $N_T$ transmitted symbol streams. The $N_R$ received symbol streams would collectively include all $N_T$ transmitted symbols streams. However, these $N_T$ symbol streams are dispersed among the $N_R$ received symbol streams.

At the receiver, various processing techniques may be used to process the $N_R$ received symbol streams to detect the $N_T$ transmitted symbol streams. These receiver processing techniques may be grouped into two primary categories:

spatial and space-time receiver processing techniques (which are also referred to as equalization techniques), and "successive nulling/equalization and interference cancellation" receiver processing technique (which is also referred to as "successive interference cancellation" (SIC) processing technique).

In general, the spatial and space-time receiver processing techniques attempt to separate out the transmitted symbol streams at the receiver. Each transmitted symbol stream may be "detected" by (1) combining the various components of this transmitted symbol stream in the $N_R$ received symbol streams based on an estimate of the channel response and (2) removing (or canceling) the interference due to the other transmitted symbol streams. Each receiver processing technique attempts to either (1) decorrelate the individual transmitted symbol streams such that there is no interference from the other transmitted symbol streams or (2) maximize the SNR of each detected symbol stream in the presence of noise and interference from the other symbol streams. Each detected symbol stream is then further processed (e.g., demodulated, deinterleaved, and decoded) to obtain the corresponding data stream.

The successive interference cancellation receiver processing technique attempts to recover the transmitted symbol streams, one stream at each stage, using spatial or space-time receiver processing. As each symbol stream is recovered, the interference caused by the recovered symbol stream on the remaining not yet recovered symbol streams is estimated and canceled from the received symbol streams, and the "modified" symbol streams are similarly processed by the next stage to recover the next transmitted symbol stream. If the symbol streams can be recovered without error (or with minimal errors) and if the channel response estimate is reasonably accurate, then cancellation of the interference due to the recovered symbol streams is effective. The later recovered symbol streams would then experience less interference and may be able to achieve higher SNRs. In this way, higher performance may be achieved for all recovered symbol streams (possibly except for the first recovered symbol stream). The SIC processing technique can outperform the spatial/space-time receiver processing techniques if the interference due to each recovered symbol stream can be accurately estimated and canceled. This requires error-free or low-error recovery of the transmitted symbol streams, which can be achieved in part by the use of an error-correction code for the symbol stream.

Figure 6:
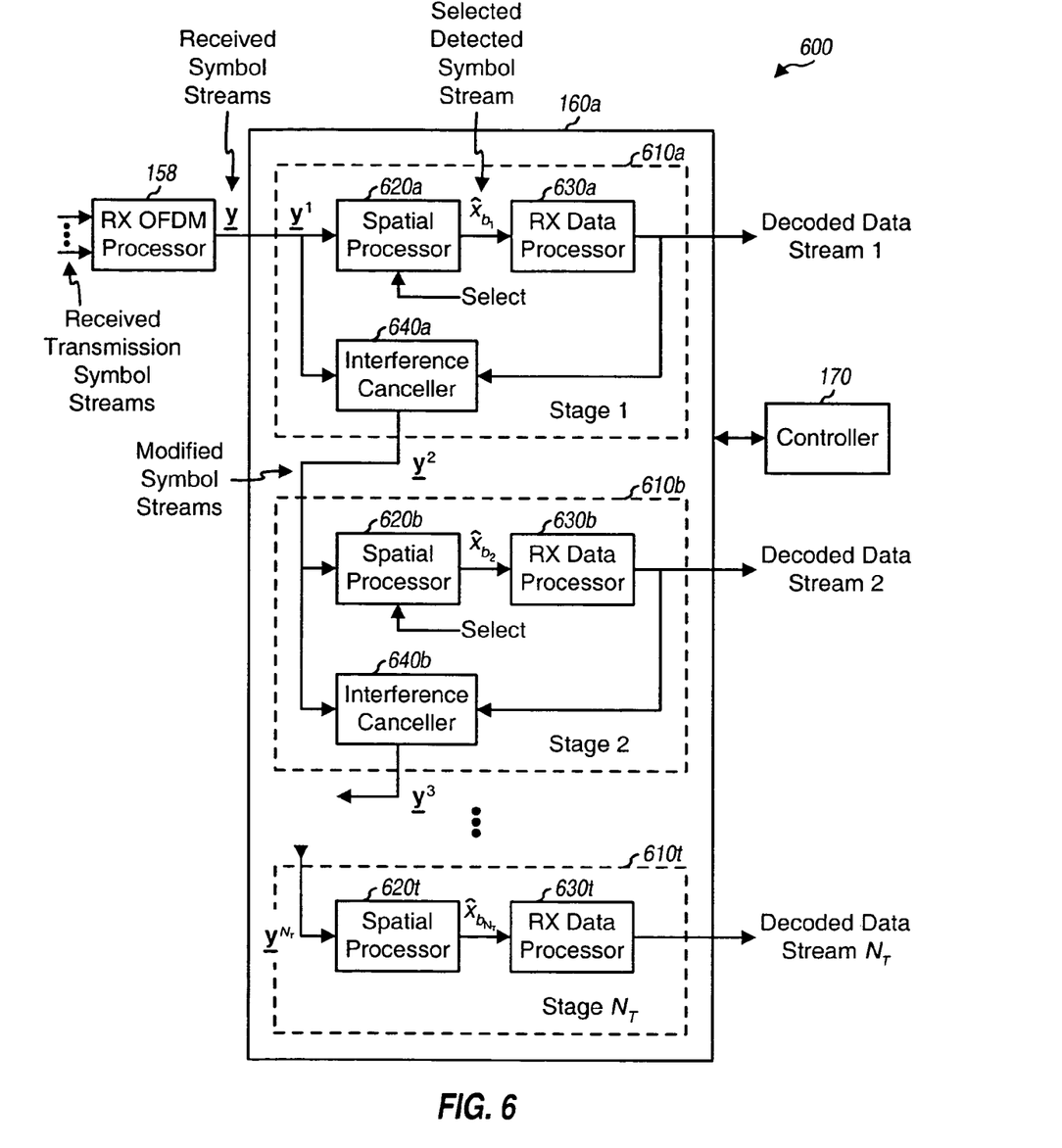
FIG. 6 is a block diagram of a receiver unit that performs SIC processing.

The following terminology is used herein:

"transmitted" symbol streams—the modulation symbol streams transmitted from the transmit antennas;

"received" symbol streams—the inputs to a spatial or space-time processor in the first stage of a SIC receiver (see FIG. 6);

"modified" symbol streams—the inputs to the spatial or space-time processor in each subsequent stage of the SIC receiver;

"detected" symbol streams—the outputs from the spatial or space-time processor (up to $N_T-l+1$ symbol streams may be detected at stage l); and "recovered" symbol stream—a symbol stream that is recovered at the receiver to obtain a decoded data stream (only one detected symbol stream is recovered at each stage).

Figure 2:
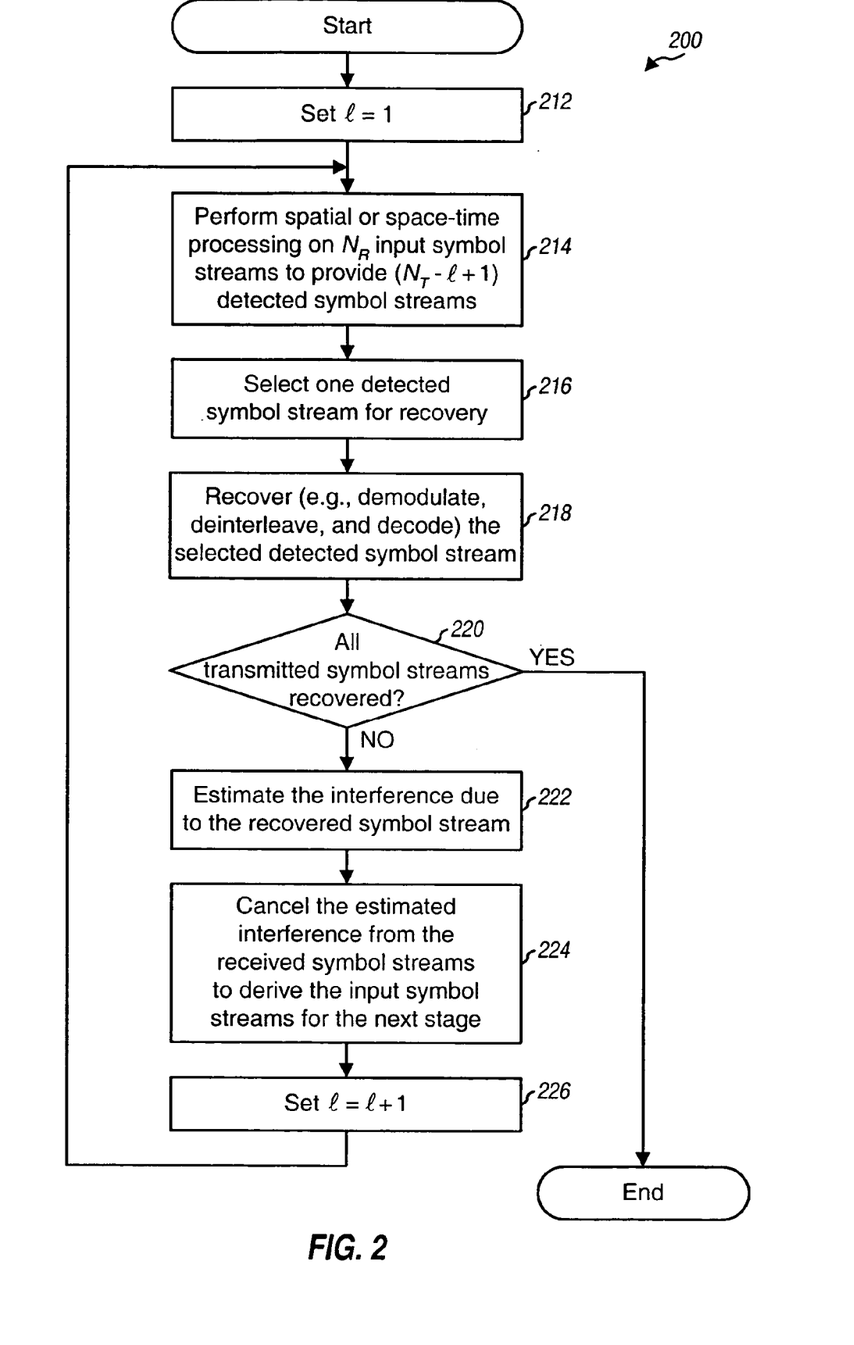
FIG. 2 is a flow diagram of a process for performing successive interference cancellation (SIC) processing on $N_R$ received symbol streams to recover $N_T$ transmitted symbol streams.

FIG. 2 is a flow diagram of a process 200 for performing successive interference cancellation processing on $N_R$ received symbol streams to recover $N_T$ transmitted symbol streams. For simplicity, the following description for FIG. 2 assumes that one independent data stream is transmitted on all frequency subchannels from each transmit antenna.

Initially, the index used to denote the stage number for the SIC receiver is set to 1 (i.e., l=1) (step 212). For each stage, the SIC receiver first performs spatial or space-time processing on the $N_R$ received symbol streams to attempt to separate out the transmitted symbol streams (step 214). For each stage, the spatial or space-time processing can provide $(N_T-l+1)$ detected symbol streams that are estimates of the transmitted symbol streams not yet recovered. One of the detected symbol streams is then selected for recovery (e.g., based on a selection technique described below) (step 216). This detected symbol stream is then processed (e.g., demodulated, deinterleaved, and decoded) to obtain a decoded data stream, which is an estimate of the transmitted data stream corresponding to the symbol stream being recovered in this stage (step 218).

A determination is then made whether or not all transmitted symbol streams have been recovered (step 220). If the answer is yes (i.e., if l=$N_T$), then the receiver processing terminates. Otherwise, the interference due to the just-recovered symbol stream is estimated (step 222). In one implementation, the interference may be estimated by first re-encoding the decoded data stream, interleaving the re-encoded data, and symbol mapping the interleaved data (using the same coding, interleaving, and modulation schemes used at the transmitter unit for this data stream) to obtain a "remodulated" symbol stream, which is an estimate of the transmitted symbol stream just recovered. The remodulated symbol stream is further processed (in either the time-domain or frequency-domain) to derive $N_R$ interference components, which are estimates of the interference due to the just-recovered symbol stream on the remaining not-yet recovered symbol streams.

The $N_R$ interference components are then subtracted from the $N_R$ received symbol streams to derive $N_R$ modified symbol streams (step 224). These modified symbol streams represent the streams that would have been received if the just-recovered symbol stream had not been transmitted (i.e., assuming that the interference cancellation was effectively performed). The index l is then incremented (i.e., l=l+1) for the next stage (step 226).

The processing performed in steps 214 through 218 is then repeated on the $N_R$ modified symbol streams (instead of the $N_R$ received symbol streams) to recover another transmitted symbol stream. Steps 214 through 218 are thus repeated for each transmitted symbol stream to be recovered, and steps 222 through 226 are performed if there is another transmitted symbol stream to be recovered.

For the first stage, the input symbol streams are the $N_R$ received symbol streams from the $N_R$ received antennas. And for each subsequent stage, the input symbol streams are the $N_R$ modified symbol streams from the preceding stage. The processing for each stage proceeds in similar manner. At each stage subsequent to the first stage, the symbol streams recovered in the prior stages are assumed to be cancelled, so the dimensionality of the matrix $\underline{H}$ or $\underline{H}$ is successively reduced by one column for each subsequent stage.

The SIC processing thus includes a number of stages, one stage for each transmitted symbol stream to be recovered. Each stage recovers one of the transmitted symbol streams and (except for the last stage) cancels the interference due to this recovered symbol stream to derive the modified symbol streams for the next stage. Each subsequently recovered symbol stream thus experiences less interference and is able to achieve a higher post-detection SNR than without the interference cancellation. The post-detection SNRs of the recovered symbol streams are dependent on the particular order in which these symbol streams are recovered.

For the successive interference cancellation receiver processing, the input symbol streams for the l-th stage (assuming that the interference from the symbol streams recovered in the prior l−1 stages have been effectively canceled) may be expressed as:

$$\underline{y}^l(k) = \underline{H}^l(k)\underline{x}^l(k) + \underline{n}, \text{ for } k=0, 1, \ldots (N_F-1), \quad \text{Eq (5)}$$

where $\underline{y}^l(k)$ is the $N_R \times 1$ modified symbol vector for tone k for the l-th stage, i.e., $\underline{y}^l(k)=[y_1^l(k)\ y_2^l(k)\ \ldots\ y_{N_R}^l(k)]^T$, where $y_i^l(k)$ is the entry for the i-th received antenna for tone k in the l-th stage;

$\underline{x}^l(k)$ is the $(N_T-l+1)\times 1$ transmitted symbol vector for tone k for the l-th stage, i.e., $$\underline{x}^l(k) = [x_{j_l}(k)\ x_{j_{l+1}}(k)\ \ldots\ x_{j_{N_T}}(k)]^T,$$

where $x_{j_n}(k)$ is the entry transmitted on tone k from transmit antenna $j_n$;

$\underline{H}^l(k)$ is the $N_R \times (N_T-l+1)$ channel frequency response matrix for the MIMO channel for tone k for the l-th stage, which is derived by removing l−1 columns in the matrix $\underline{H}(k)$ corresponding to the l−1 previously recovered symbol streams, i.e., $$\underline{H}^l(k) = [\underline{h}_{j_l}(k)\ \underline{h}_{j_{l+1}}(k)\ \ldots\ \underline{h}_{j_{N_T}}(k)],$$

where $\underline{h}_{j_n}(k)$ is the $N_R \times 1$ vector for the frequency response for tone k between transmit antenna $j_n$ and the $N_R$ receive antennas; and $\underline{n}$ is the additive white Gaussian noise.

For the l-th stage, the l−1 previously recovered symbol streams are given indices of $j_1, j_2, \ldots j_{l-1}$ and the $(N_T-l+1)$ not-yet-recovered symbol streams are given indices of $j_l, j_{l+1}, \ldots j_{N_T}$. Equation (5) may be rewritten as:

$$\underline{y}^l(k) = \sum_{n=l}^{N_T} \underline{h}_{j_n}(k)x_{j_n}(k) + \underline{n}. \quad \text{Eq. (6)}$$

The vector $\underline{y}^l(k)$, for k=0, 1, ... $(N_F-1)$, represents the NR modified symbol streams to be provided to the l-th stage of the SIC receiver.

The l-th stage initially performs spatial or space-time processing on the $N_R$ modified symbol streams to attempt to separate out the $(N_T-l+1)$ transmitted symbol streams that have not yet been recovered. Each transmitted symbol stream may be "isolated" by filtering the $N_R$ modified symbol streams with a filter matched to that symbol stream. The match filter for the symbol stream from transmit antenna m has a unit norm vector, $\underline{w}_m(k)$, of $N_R$ filter coefficients for each tone k, where k=0, 1, ... $(N_F-1)$. To minimize the interference from the other $(N_T-1)$ not-yet-recovered symbol streams on the symbol stream from transmit antenna m, the vector $\underline{w}_m(k)$ is defined to be orthogonal to $\{\underline{h}_{j_n}(k)\}$ (i.e., $\underline{w}_m^H(k)\underline{h}_{j_n}(k)=0$), for n=l, l+1, ... $N_T$ where $j_n \neq m$, and also for each tone k where k=0, 1, ... $(N_F-1)$.

Since the transmitted symbol streams from the other (l−1) transmit antennas have already been recovered in prior stages and have been canceled from the modified symbol streams $\underline{y}^l(k)$ for the l-th stage, the vector $\underline{w}_m(k)$ does not need to be orthogonal to $\{\underline{h}_{j_n}(k)\}$, for n=1, 2, ... l−1 and k=0, 1, ... $(N_F-1)$. The match filter response $\underline{w}_m(k)$ may be derived based on various spatial or space-time processing technique, as described below.

The detected symbol stream, $\hat{x}_m$, from transmit antenna m may then be estimated as:

$$\hat{x}_m(k)=\underline{w}_m^H(k)\underline{y}^l(k)=\underline{w}_m^H(k)\underline{h}_m(k)x_m(k)+\underline{w}_m^H(k)\underline{n}. \quad \text{Eq (7)}$$

The spatial or space-time processing for the l-th stage of the SIC receiver can provide $(N_T-l+1)$ detected symbol streams, $\{\hat{x}_m\}$ for m=$j_l, j_{l+1}, \ldots j_{N_T}$. Each detected symbol stream includes estimates of the modulation symbols transmitted on all $N_F$ frequency subchannels from a respective transmit antenna. The spatial processing effectively maps the MIMO system to a number of parallel single-input single-output (SISO) systems. One of the $(N_T-l+1)$ detected symbol streams at the l-th stage may then be selected for further processing to obtain the data for that symbol stream.

The selection of a specific one of the $(N_T-l+1)$ detected symbol streams to recover in each stage has a large impact on system performance. Each of the $(N_T-l+1)$ detected symbol streams is associated with a particular "quality" that determines the likelihood of that symbol stream being recovered correctly. Improved performance may be achieved by recovering the detected symbol stream having the highest quality at each stage. This is because the recovered symbol stream is further processed to derive an estimate of the interference this symbol stream causes to all later recovered symbol streams. Thus, if the selected detected symbol stream cannot be recovered error-free, then any errors would propagate to the interference estimate. If the interference estimate is inaccurate (due to error propagation), then the recovered symbol stream cannot be effectively canceled out, and any uncanceled interference would degrade the quality of all remaining not-yet-recovered symbol streams.

In one conventional SIC processing scheme, which is often referred to as a "vertical" SIC processing scheme, one symbol stream is transmitted from each transmit antenna, the post-detection SNRs of all detected symbol streams are determined at the receiver for each stage, and the symbol stream with the highest post-detection SNR is selected for further processing to recover the transmitted data. For a flat-fading (or AWGN) channel whereby the frequency response is approximately constant across the system bandwidth, the post-detection SNR may be estimated for the entire system bandwidth and used in a straightforward manner to select a specific symbol stream for recovery. However, for a multipath channel with frequency selective fading, different post-detection SNRs may be achieved for different frequency bins across the system bandwidth. In this case, the post-detection SNRs cannot be used directly to select symbol streams for recovery.

In another conventional SIC processing scheme, which is often referred to as a "diagonal" SIC processing scheme, each symbol stream is transmitted over multiple transmit antennas and frequency subchannels to mitigate the effects of frequency selective fading. For example, if the $N_F$ modulation symbols for stream m for a given transmission symbol period is $\underline{x}_m = [x_m(0)\ x_m(1)\ \ldots\ x_m(N_F-1)]$ and if $N_F$ is an integer multiple of $N_T$, then the modulation symbols for the $N_T$ streams may be ordered as follows:

$$\underline{X} = \begin{bmatrix} x_1(0) & x_{N_T}(1) & x_{N_T-1}(2) & \cdots & x_2(N_F-1) \\ x_2(0) & x_1(1) & x_{N_T}(2) & \cdots & x_3(N_F-1) \\ x_3(0) & x_2(1) & x_1(2) & \cdots & x_4(N_F-1) \\ \vdots & \vdots & \vdots & \ddots & \\ x_{N_T}(0) & x_{N_T-1}(1) & x_{N_T-2}(2) & \cdots & x_1(N_F-1) \end{bmatrix}, \quad \text{Eq (8)}$$

where each row of $\underline{X}$ represents the modulation symbols transmitted from one transmit antenna and each column of $\underline{X}$ represents the modulation symbols transmitted on one frequency subchannel. As shown in equation (8), the modulation symbols for a given stream is transmitted diagonally over all transmit antennas and all frequency subchannels. This diagonal symbol ordering attempts to provide similar post-detection SNRs for the detected symbol streams at the receiver, so that any detected symbol stream may be selected for recovery at each stage. The diagonal SIC processing scheme obviates the need to specifically select the best detected symbol stream for recovery at each stage. However, this scheme also provides sub-optimal performance.

Techniques are provided herein to select and recover the detected symbol streams in a particular order, when using SIC processing, such that improved performance may be achieved. In an aspect, metrics indicative of the quality or "goodness" of a detected symbol stream are provided. These metrics may be used for multipath channels with frequency selective fading. In another aspect, techniques are provided to process the received symbol streams, using SIC processing, to recover a number of transmitted symbol streams. The particular order in which the transmitted symbol streams are recovered is determined based on the metrics determined for the detected symbol streams at each stage of the SIC processing. These and other aspects and embodiments of the techniques are described below.

In an aspect, metrics are provided herein that may be used as indications of the quality or goodness of a detected symbol stream. These metrics may be derived based on the post-detection SNR, some other parameters, or any combination thereof.

Referring back to equation (7), the post-detection SNR of the symbol on tone k of detected symbol stream $\hat{x}_m$, which is denoted as SNR $x_m(k)$, may be expressed as:

$$SNR_m(k) = \frac{|\underline{w}_m^H(k)\underline{h}_m(k)|^2}{\sigma^2}, \quad \text{Eq (9)}$$

where the expected variance of the transmitted modulation symbol $x_m(k)$ on tone k is equal to 1.0, and $\sigma^2$ is the variance of the post-detection noise, $\underline{n}' = \underline{w}_m^H(k)\underline{n}$ (where $\sigma^2$ is the variance of $\underline{n}$ and $\underline{w}_m$ is unit norm, and hence $\underline{w}_m^H \underline{w}_m = 1$).

The post-detection SNR for detected symbol $\hat{x}_m(k)$ may be mapped to channel capacity based on either an unconstrained or constrained capacity function. The unconstrained capacity function, $f(z)$, provides the absolute capacity of a SISO system, which is typically given as a theoretical maximum rate that may be reliably transmitted for a given SNR (where the parameter z comprises the post-detection SNR). The constrained capacity function, $\tilde{f}(z')$, provides a "constrained" capacity of a SISO system, which is dependent on various system parameters such as the specific modulation scheme $M_m(k)$ or constellation used to derive the modulation symbol $x_m(k)$. The parameter $z'$ for $\tilde{f}(z')$ comprises the post-detection SNR, the modulation scheme, and possibly some other factor. The constrained capacity is lower than the absolute capacity.

The unconstrained capacity function, $f(z)$, which is also referred to as the Shannon or theoretical capacity function, for a post-detection SNR of $SNR_m(k)$ is given as:

$$f(z) = \log_2[1 + SNR_m(k)]. \quad \text{Eq (10)}$$

The constrained capacity function, $\tilde{f}(z')$, may be expressed as:

$$\tilde{f}(z') = M_{m,k} - \frac{1}{2^{M_{m,k}}} \sum_{i=1}^{2^{M_{m,k}}} E \quad \text{Eq (11)}$$

$$\left[ \log_2 \sum_{j=1}^{2^{M_{m,k}}} \exp(-SNR_m(k)(|a_i - a_j|^2 + 2\text{Re}\{\eta^*(a_i - a_j)\})) \right]$$

where $M_{m,k}$ is related to the modulation scheme $M_m(k)$ (i.e., the modulation scheme $M_m(k)$ corresponds to a $2^{M_{m,k}}$-ary constellation (e.g., $2^{M_{m,k}}$-ary QAM), where each of the $2^{M_{m,k}}$ points in the constellation may be identified by $M_{m,k}$ bits);

$a_i$ and $a_j$ are the signal points in the $2^{M_{m,k}}$-ary constellation; and $\eta$ is a complex Gaussian random variable with zero mean and a variance of $1/SNR_m(k)$.

In equation (11), the expectation operation is taken with respect to the variable $\eta$.

The unconstrained channel capacity, $C_m(k)$, for tone k of transmit antenna m, which achieves a post-detection SNR of $SNR_m(k)$ shown in equation (9), may then be expressed as:

$$C_m(k) = \log_2\left(1 + \frac{|\underline{w}_m^H(k)\underline{h}_m(k)|^2}{\sigma^2}\right). \quad \text{Eq (12)}$$

Since the $N_F$ frequency subchannels used to transmit the modulation symbols for symbol stream $x_m$ are orthogonal and moreover the different received symbols are statistically independent due to independent noise realizations, the overall unconstrained channel capacity, $C_m$, of all $N_F$ tones on transmit antenna m may be derived by summing the unconstrained channel capacities of the individual tones, as follows:

$$C_m = \sum_{k=0}^{N_F-1} C_m(k) = \sum_{k=0}^{N_F-1} \log_2\left(1 + \frac{|\underline{w}_m^H(k)\underline{h}_m(k)|^2}{\sigma^2}\right). \quad \text{Eq (13)}$$

The constrained channel capacity, $\tilde{C}_m(k)$, for tone k on transmit antenna m may similarly be derived based on the constrained capacity function, $\tilde{f}(z)$, shown in equation (11). The overall constrained channel capacity, $\tilde{C}_m$, for all $N_F$ tones on transmit antenna m may then be derived by summing the constrained channel capacities of the individual tones, similar to that shown in equation (13).

The overall (unconstrained or constrained) channel capacity may be determined for all transmission channels used to transmit each of the $(N_T-l+1)$ detected symbol streams at the l-th stage of the SIC receiver. The overall channel capacity associated with each detected symbol stream may then be mapped to an equivalent SNR for an AWGN channel (with constant SNR affecting all tones) using an inverse capacity function, as follows:

$$SNR_{m,equiv} = 2^{C_m} - 1. \quad \text{Eq (14)}$$

A set of equivalent SNRs may be determined for the $(N_T-l+1)$ detected symbol streams at the l-th stage of the SIC receiver, and may be represented as $S_l = \{SNR_{m,equiv}, m=j_l, j_{l+1}, \ldots j_{N_T}\}$. The detected symbol stream associated with the highest equivalent SNR for the AWGN channel may then be selected for recovery. The index $b_l$ of the selected detected symbol stream may be given as:

$$b_l = index\left(\max_m\{SNR_{m,equiv} \in S_l\}\right). \quad \text{Eq (15)}$$

In an alternative embodiment, the symbol stream may be selected based on the overall (unconstrained or constrained) channel capacities determined for the detected symbol streams. This is made possible by the fact that the capacity functions are monotonically increasing in SNR. A set of overall channel capacities may be determined for the $(N_T-l+1)$ detected symbol streams at the l-th stage of the SIC receiver, using equation (13), and may be represented as $C_l = \{C_m, m=j_l, j_{l+1}, \ldots j_{N_T}\}$. The detected symbol stream associated with the highest overall channel capacity may then be selected for recovery. The index $b_l$ of the selected detected symbol stream may be given as:

$$b_l = index\left(\max_m\{C_m \in C_l\}\right). \quad \text{Eq (16)}$$

Figure 3:
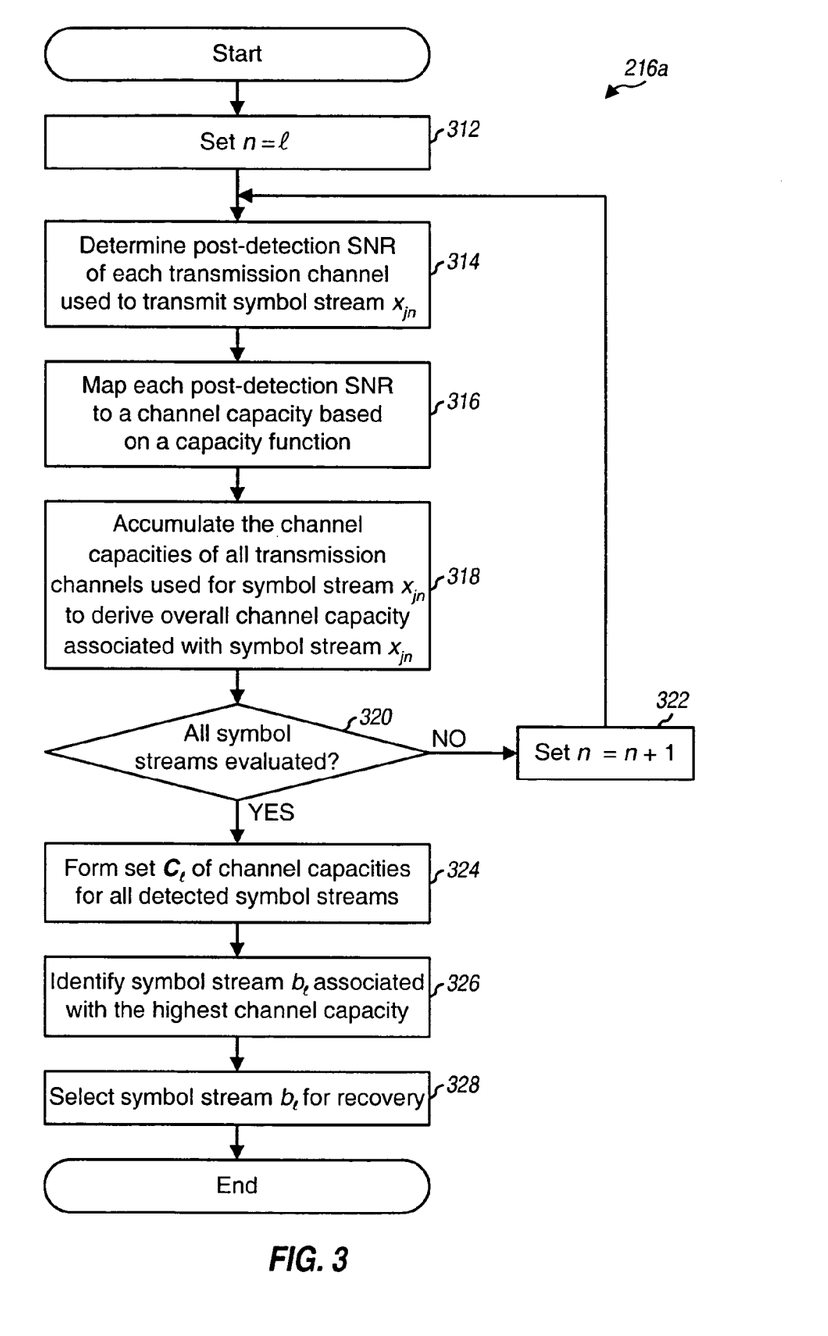
FIG. 3 is a flow diagram of an embodiment of a process for selecting a particular detected symbol stream at stage l of a SIC receiver for recovery.

FIG. 3 is a flow diagram of an embodiment of a process 216a for selecting a particular detected symbol stream for recovery at stage l of the SIC receiver. Process 216a may be used for step 216 in FIG. 2.

Initially, the index n used to identify the symbol stream being evaluated is set to the first detected symbol stream in stage l (i.e., n=l) (step 312). In stage l, $(N_T-l+1)$ symbol streams are detected by the spatial or space-time processing and are labeled as detected symbol streams $\hat{x}_{j_l}$ through $$\hat{x}_{j_{N_T}}.$$

The post-detection SNR of each transmission channel used to transmit symbol stream $j_n$ is then determined (step 314). If one symbol stream is transmitted on all frequency subchannels of each transmit antenna, then the post-detection SNRs of all frequency subchannels used to transmit symbol stream $j_n$ are determined. Each post-detection SNR is then mapped to channel capacity based on a (unconstrained or constrained) capacity function, such as that shown in equation (10) or (11) (step 316). The channel capacities of all transmission channels used for symbol stream $j_n$ are then accumulated to derive an overall channel capacity, $C_{j_n}$, associated with detected symbol stream $\hat{x}_{j_n}$. The overall channel capacity, $C_{j_n}$, or the equivalent SNR, $SNR_{j_n,equiv}$, may be used as an indication of the quality or goodness of detected symbol stream $\hat{x}_{j_n}$ (step 318).

A determination is then made whether or not all detected symbol streams in stage l have been evaluated (step 320). If $n<N_T$, indicating that at least one detected symbol stream has not been evaluated, then the index n is incremented (step 322), and the process returns to step 314 to evaluate the next detected symbol stream. Otherwise, a set $C_l$ of $(N_T-l+1)$ overall channel capacities associated with the $(N_T-l+1)$ detected symbol streams is formed (step 324). The detected symbol stream $\hat{x}_{b_l}$, associated with the highest overall channel capacity in the set $C_l$ is then identified, as shown in equation (16) (step 326). This detected symbol stream $\hat{x}_{b_l}$ is then selected for recovery (step 328). The stream selection process then terminates.

Figure 4:
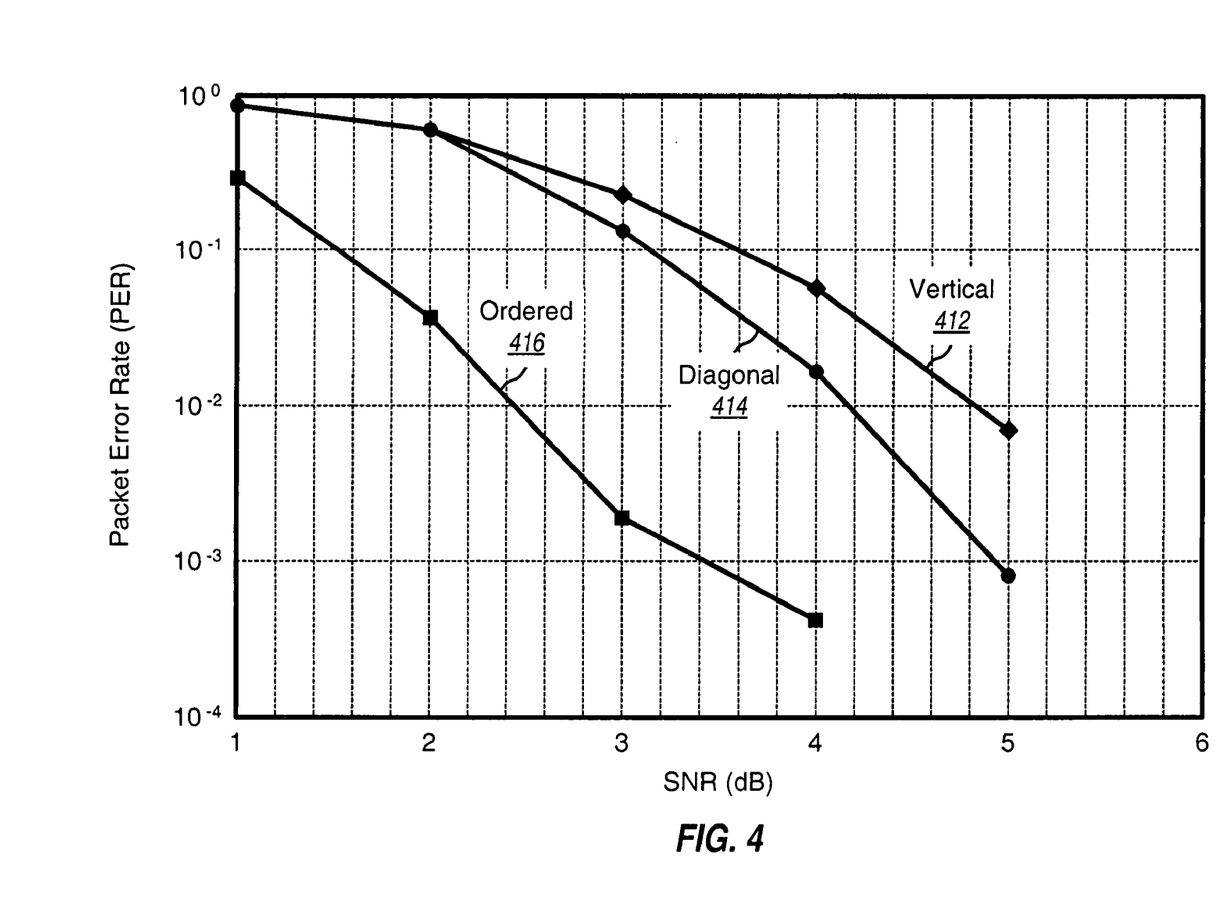
FIG. 4 shows the performance of various SIC processing schemes.

FIG. 4 shows the performance of various SIC processing schemes. The performance is provided for a (2, 4) MIMO system with two transmit antennas and four receive antennas, and which uses 16-QAM with rate ½ Turbo coding. Three SIC processing schemes are evaluated, which are:

1. Vertical SIC processing scheme—One symbol stream is transmitted on all $N_F$ frequency subchannels of each transmit antenna. At each stage of the SIC receiver, the detected symbol stream from the lowest numbered transmitted antenna is selected for recovery (i.e., the detected symbol stream from transmit antenna 1, then antenna 2, and so on).

2. Diagonal SIC processing scheme—Each symbol stream is transmitted diagonally across all $N_F$ frequency subchannels and all $N_T$ transmit antennas. The lowest numbered detected symbol stream is selected for recovery at each stage of the SIC receiver (which is comparable to random selection since all streams are approximately equal).

3. Ordered SIC processing scheme—One symbol stream is transmitted on all $N_F$ frequency subchannels of each transmit antenna, similar to the vertical SIC processing scheme. However, at each stage of the SIC receiver, the detected symbol stream associated with the highest equivalent SNR or overall channel capacity is selected for recovery.

As shown in FIG. 4, the ordered SIC processing scheme provides improved performance over the conventional vertical and diagonal SIC processing schemes for all SNRs and all packet error rates. At 1% PER, the ordered SIC processing scheme provides approximately 1.8 dB gain over the diagonal SIC processing scheme and 2.4 dB gain over the vertical SIC processing scheme. The ordered SIC scheme can thus (1) provide a lower packet error rate than the vertical and diagonal SIC processing schemes for a given data rate, or (2) support a higher data rate than the vertical and diagonal SIC processing schemes for a given packet error rate.

For both of the channel capacity and the equivalent SNR metrics shown in equations (13) and (14), respectively, the post-detection SNR of each transmission channel used for a given symbol stream is first mapped to channel capacity by a capacity function. The capacities of all transmission channels used for the symbol stream are then summed to obtain the metric for the symbol stream.

Other functions may also be used to map the post-detection SNRs to some intermediate values before combining these values to obtain the metric, and this is within the scope of the invention. For example, a table that maps post-detection SNRs to "supportable" throughputs may be derived. The supportable throughput may be related to channel capacity but may take into consideration other system imperfections (degradations due to implementation losses at the transmitter and receiver). This table may be derived by empirical measurements, simulation, and so on, and may be determined for a particular target packet error rate (PER). As another example, a function that approximates a log function may also be used.

The channel capacity and the equivalent SNR are two metrics that may be used as indications of the quality or goodness of the detected symbol streams for a multipath channel. Each of these metrics determines the overall quality of all transmission channels used for a given symbol stream. For the above example, since each symbol stream is transmitted over all $N_F$ frequency subchannels of one transmit antenna, the metric is derived by summing the contributions from all $N_F$ frequency subchannels for this antenna. In general, each symbol stream may be transmitted over any combination of spatial and frequency subchannels (e.g., diagonally across all transmit antennas and frequency subchannels as described above). Moreover, each symbol stream may be transmitted via a different number of transmission channels. The metric for each symbol stream may then be derived by summing the contributions from all spatial and frequency subchannels used for the symbol stream.

Other metrics may also be used as indications of the quality or goodness of the detected symbol streams, and this is within the scope of the invention. For example, the post-detection SNRs for all transmission channels used for a given symbol stream may be weighted and then summed together to derive a metric for the symbol stream. The weighting may be dependent on the post-detection SNR value, and may approximate a log function. Alternatively, the weighting may be performed in stepwise manner such that each range of post-detection SNRs is associated with a respective weight to be used for that range. The weighting may also be uniform (i.e., ones for all post-detection SNRs).

In some MIMO systems, very limited amount of information regarding the MIMO channel may be available to the transmitter. For example, only the operating SNR, which may be the average or expected (but not necessarily the instantaneous) received SNR at the receiver, may be available to the transmitter. The operating SNR may be determined based on measurements at the receiver and may be periodically provided to the transmitter, as described above for FIG. 1. Alternatively, the operating SNR may be an estimate of the MIMO channel in which the transmitter is expected to operate. In any case, the operating SNR is given or specified for the MIMO system.

If channel state information indicative of the current channel conditions is not available at the transmitter, then the transmitter is not able to perform adaptive rate control for the transmitted data streams. For example, if only the operating SNR is available at the transmitter, then the same data rate may be used for all data streams transmitted over the $N_T$ transmit antennas. In this case, at each stage of the SIC receiver, the detected symbol stream associated with the best metric may then be selected for recovery.

As noted above, for the SIC receiver, the SNR of each recovered symbol stream is dependent on the stage at which the symbol stream is recovered. In particular, for a flat-fading channel, the post-detection SNR of the detected symbol stream selected in the l-th stage may be expressed as:

$$SNR_{pd}(l) = \left(\frac{N_R - N_T + l}{N_T N_R}\right) SNR_{rx}, \quad \text{Eq (17)}$$

where the received SNR may be expressed as $$SNR_{rx} = \frac{P_{tot} N_R}{\sigma^2},$$

and $P_{tot}$ is the total transmit power available for data transmission, which is uniformly distributed across the $N_T$ transmit antennas such that $P_{tot}/N_T$ is used for each transmit antenna. Equation (17) assumes that the same data rate is used for all transmitted data streams.

Since the later recovered symbol streams achieve higher post-detection SNRs on the average, a non-uniform distribution of data rates may be used for the transmitted data streams. One technique for determining a set of data rates for the transmitted data streams, when SIC processing is used at the receiver, is described in U.S. patent application Ser. No. 10/087,503, entitled "Data Transmission with Non-Uniform Distribution of Data Rates for a Multiple-Input Multiple-Output (MIMO) System," filed Mar. 1, 2002, assigned to the assignee of the present application and incorporated herein by reference. As used herein, a non-uniform distribution of data rates means that at least two data streams have different data rates (and it is possible that some data streams may have the same data rate).

For a MIMO system that transmits using a non-uniform distribution of data rates to achieve higher overall throughput, the equivalent SNR may be determined for each detected symbol stream at stage l. However, instead of selecting the detected symbol stream with the highest equivalent SNR for recovery, the detected symbol stream with the highest margin may be selected instead. This may be achieved by first determining the SNR required for each detected symbol stream for a particular PER based on its data rate. The required SNRs for a set of data rates for the particular PER may be determined and stored in a table. For each detected symbol stream, a margin is then computed as the difference between the equivalent SNR and the required SNR. A set of margins for the detected symbol streams is then formed, and the detected symbol stream associated with the highest margin may then be selected for recovery. The metric used for selecting detected symbol streams for recovery thus relates to the margins for these detected symbol streams.

For clarity, various aspects and embodiments of the inventive techniques have been described for a MIMO system that implements OFDM. In general, the technique described herein may be used to consider the frequency selective fading nature of multipath channels when performing successive interference cancellation processing at the receiver, regardless of whether or not OFDM is used. The post-detection SNRs may be determined for different frequency bins, and the frequency selective nature of the multipath channels may be accounted for in the manner described above.

For simplicity, the inventive techniques have been described specifically for a MIMO system. These techniques may also be used for other multi-channel communication systems.

Transmitter System

Figure 5:
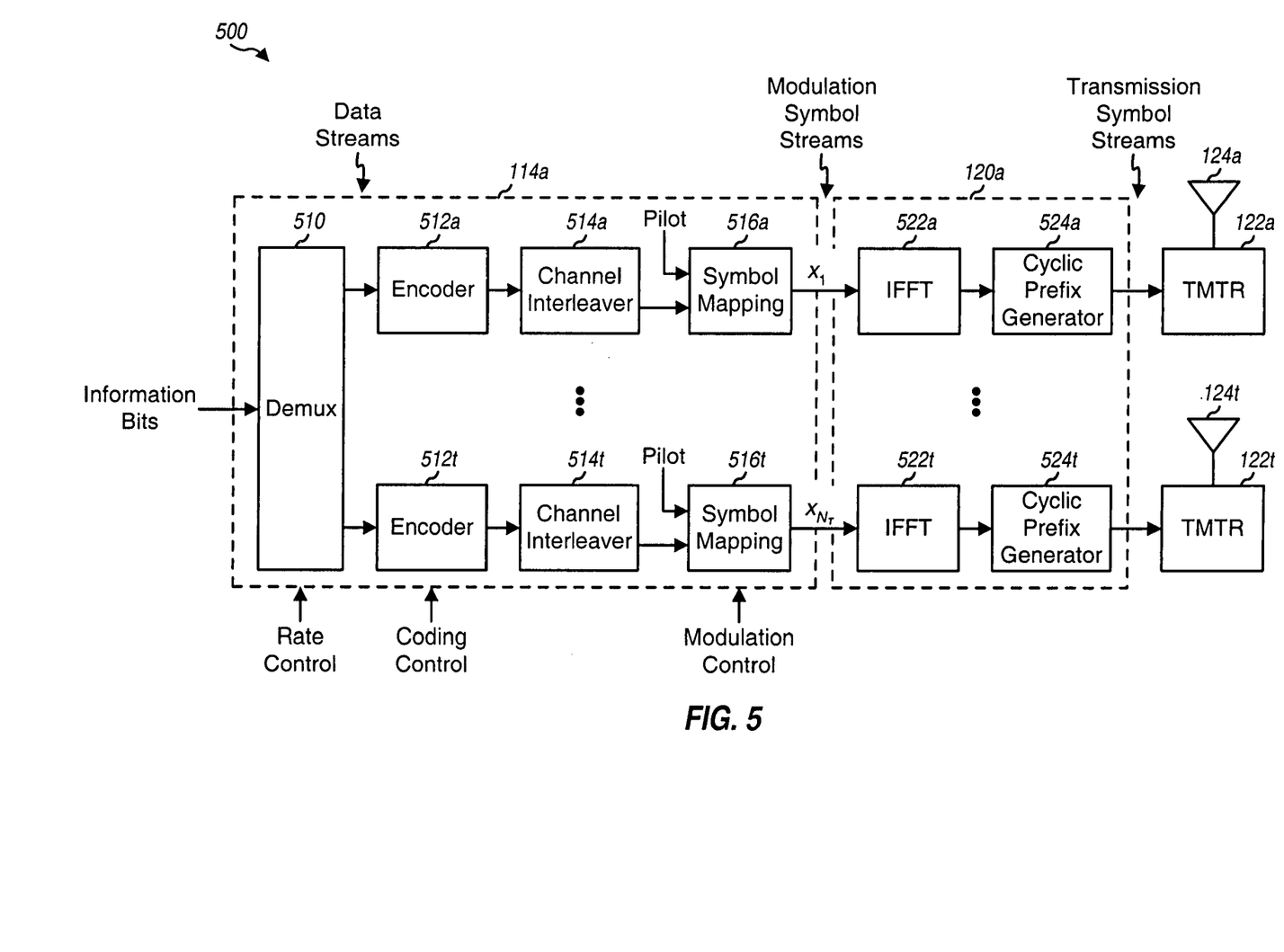
FIG. 5 is a block diagram of a transmitter unit in the MIMO-OFDM system.

FIG. 5 is a block diagram of a transmitter unit 500, which is an embodiment of the transmitter portion of transmitter system 110 in FIG. 1. Transmitter unit 500 includes (1) a TX data processor 114a that codes and modulates each data stream in accordance with a particular coding and modulation scheme to provide a corresponding modulation symbol stream and (2) a TX OFDM processor 120a that performs OFDM processing on each modulation symbol stream to provide a corresponding transmission symbol stream. TX data processor 114a and TX OFDM processor 120a are one embodiment of TX data processor 114 and TX OFDM processor 120, respectively, in FIG. 1.

In an embodiment, the same data rate is used for all data streams to be transmitted on the $N_T$ transmit antennas. In another embodiment, a non-uniform distribution of data rates is used for the data streams to be transmitted on the $N_T$ transmit antennas. For this embodiment, the rate selection may be performed as described in the aforementioned U.S. patent application Ser. No. 10/087,503. In an embodiment, each of the $N_T$ data streams to be transmitted on the $N_T$ transmit antennas is independently processed (i.e., separate coding and modulation on a per-antenna basis) to provide a corresponding modulation symbol stream. The same or different coding and modulation schemes may be used for the $N_T$ data streams. The specific coding and modulation scheme to be used for each data stream may be determined by controls provided by controller 130.

In the specific embodiment shown in FIG. 5, TX data processor 114a includes a demultiplexer 510, $N_T$ encoders 512a through 512t, $N_T$ channel interleavers 514a through 514t, and $N_T$ symbol mapping elements 516a through 516t, (i.e., one set of encoder, channel interleaver, and symbol mapping element for each data stream). Demultiplexer 510 demultiplexes the traffic data (i.e., the information bits) into $N_T$ data streams for the $N_T$ transmit antennas. The $N_T$ data streams are provided at data rates determined to be supported by the communication link and indicated by a rate control provided by controller 130. Each data stream is provided to a respective encoder 512.

Each encoder 512 codes a respective data stream based on the specific coding scheme selected for that data stream to provide coded bits. The coding increases the reliability of the data transmission. The coding scheme may include any combination of cyclic redundancy check (CRC) coding, convolutional coding, Turbo coding, block coding, and so on. The coded bits from each encoder 512 are then provided to a respective channel interleaver 514, which interleaves the coded bits based on a particular interleaving scheme. The interleaving provides time diversity for the coded bits, permits the data to be transmitted based on an average SNR for the transmission channels (e.g., the frequency subchannels) used for the data stream, combats fading, and further removes correlation between coded bits used to form each modulation symbol.

The coded and interleaved bits from each channel interleaver 514 are provided to a respective symbol mapping element 516, which maps these bits to form modulation symbols. The particular modulation scheme to be implemented by each symbol mapping element 516 is determined by a modulation control provided by controller 130. Each symbol mapping element 516 groups each set of $q_j$ coded and interleaved bits to form a non-binary symbol, and further maps the non-binary symbol to a specific point in a signal constellation corresponding to the selected modulation scheme (e.g., QPSK, M-PSK, M-QAM, or some other modulation scheme). Each mapped signal point corresponds to an $M_j$-ary modulation symbol, where $M_j$ corresponds to the specific modulation scheme selected for the j-th transmit antenna and $M_j = 2^{q_j}$. Pilot data may also be symbol mapped to provide pilot symbols, which may then be multiplexed (e.g., using TDM or CDM) with the modulation symbols for the coded and interleaved bits. Symbol mapping elements 516a through 516t then provide $N_T$ streams of modulation symbols.

In the specific embodiment shown in FIG. 5, TX OFDM processor 120a includes $N_T$ OFDM modulators, with each OFDM modulator including an inverse Fourier transform (IFFT) unit 522 and a cyclic prefix generator 524. Each IFFT 522 receives a respective modulation symbol stream from an associated symbol mapping element 516. Each IFFT 522 groups each set of $N_F$ modulation symbols to form a corresponding modulation symbol vector, and converts this vector into its time-domain representation (which is referred to as an OFDM symbol) using the inverse fast Fourier transform. IFFT 522 may be designed to perform the inverse transform on any number of frequency subchannels (e.g., 8, 16, 32, ..., $N_F$, ...). For each OFDM symbol, cyclic prefix generator 524 repeats a portion of the OFDM symbol to form a corresponding transmission symbol. The cyclic prefix ensures that the transmission symbol retains its orthogonal properties in the presence of multipath delay spread, thereby improving performance against deleterious path effects such as channel dispersion caused by frequency selective fading. Cyclic prefix generator 524 then provides a stream of transmission symbols to an associated transmitter 122.

Each transmitter 122 receives and processes a respective transmission symbol stream to generate a modulated signal, which is then transmitted from the associated antenna 124.

The coding and modulation for MIMO systems with and without OFDM are described in further detail in the following U.S. patent applications:

U.S. patent application Ser. No. 09/993,087, entitled "Multiple-Access Multiple-Input Multiple-Output (MIMO) Communication System," filed Nov. 6, 2001;

U.S. patent application Ser. No. 09/854,235, entitled "Method and Apparatus for Processing Data in a Multiple-Input Multiple-Output (MIMO) Communication System Utilizing Channel State Information," filed May 11, 2001;

U.S. patent application Ser. Nos. 09/826,481 and 09/956,449, both entitled "Method and Apparatus for Utilizing Channel State Information in a Wireless Communication System," respectively filed Mar. 23, 2001 and Sep. 18, 2001;

U.S. patent application Ser. No. 09/776,075, entitled "Coding Scheme for a Wireless Communication System," filed Feb. 1, 2001; and U.S. patent application Ser. No. 09/532,492, entitled "High Efficiency, High Performance Communications System Employing Multi-Carrier Modulation," filed Mar. 30, 2000.

These applications are all assigned to the assignee of the present application and incorporated herein by reference. Other designs for the transmitter unit may also be implemented and are within the scope of the invention.

Receiver System

FIG. 6 is a block diagram of a receiver unit 600, which is one embodiment of the receiver portion of receiver system 150 in FIG. 1. Receiver unit 600 includes a RX MIMO/data processor 160a that performs SIC processing.

Referring back to FIG. 1, the signals transmitted from $N_T$ transmit antennas are received by each of $N_R$ antennas 152a through 152r and routed to a respective receiver 154. Each receiver 154 conditions (e.g., filters, amplifies, and downconverts) a respective received signal, digitizes the conditioned signal to provide samples, and further processes (e.g., data demodulates) the samples to provide a stream of received transmission symbols. The received transmission symbol streams from all receivers 154 are then provided to RX OFDM processor 158.

RX OFDM processor 158 includes a cyclic prefix removal element and an FFT processor. For each received transmission symbol stream, the cyclic prefix removal element removes the cyclic prefix previously inserted in each transmission symbol by the transmitter system to provide a corresponding received OFDM symbol. The FFT processor then transforms each received OFDM symbol to provide a vector of $N_F$ received symbols for the $N_F$ frequency subchannels used for that symbol period. RX OFDM processor 158 then provides $N_R$ received symbol streams to RX MIMO/data processor 160a.

In the embodiment shown in FIG. 6, RX MIMO/data processor 160a includes a number of successive (i.e., cascaded) receiver processing stages 610a through 610t, one stage for each of the symbol streams to be recovered. Each receiver processing stage 610 (except for the last stage 610t) includes a spatial processor 620, an RX data processor 630, and an interference canceller 640. The last stage 610t includes only spatial processor 620t and RX data processor 630t.

For the first stage 610a, spatial processor 620a receives and processes the $N_R$ received symbol streams (denoted as a vector $\underline{y}^1$) from RX OFDM processor 158 based on a particular spatial or space-time receiver processing technique to provide $N_T$ detected symbol streams (denoted as a vector $\hat{\underline{x}}^1$). One of the detected symbol streams is then selected for recovery based on the selection technique described above. The selected detected symbol stream, $\hat{x}_{b_1}$, is then provided to RX data processor 630a. Processor 630a further processes (e.g., demodulates, deinterleaves, and decodes) this symbol stream $\hat{x}_{b_1}$ to provide a corresponding decoded data stream, which is an estimate of the transmitted data stream corresponding to the symbol stream being recovered. Spatial processor 620a may further provide an estimate of the channel frequency response matrix $\underline{H}$, which is used to perform the spatial or space-time processing for all stages.

For the first stage 610a, interference canceller 640a also receives the $N_R$ received symbol streams from receivers 154 (i.e., the vector $\underline{y}^1$). Interference canceller 640a further receives the decoded data stream from RX data processor 630a and performs the processing (e.g., encoding, interleaving, and symbol mapping) to derive a remodulated symbol stream, $\check{x}_{b_1}$, which is an estimate of the symbol stream just recovered. The remodulated symbol stream $\check{x}_{b_1}$ is further processed in the time or frequency domain to derive estimates of the interference components (denoted as an interference vector $\underline{i}^1$) due to the just-recovered symbol stream. For the time-domain implementation, the remodulated symbol stream $\check{x}_{b_1}$ is OFDM processed to obtain a transmission symbol stream, which is further convolved by each of $N_R$ elements in a channel impulse response vector $\underline{h}_{b_1}$ to derive $N_R$ interference components due to the just-recovered symbol stream. The vector $\underline{h}_{b_1}$ is a column of the channel impulse response matrix, $\underline{H}$, corresponding to transmit antenna $b_1$ used for the just-recovered symbol stream. The vector $\underline{h}_{b_1}$ includes $N_R$ elements that define the channel impulse response between transmit antenna $b_1$ and the $N_R$ receive antennas. For the frequency-domain implementation, the remodulated symbol stream $\check{x}_{b_1}$ is multiplied by each of $N_R$ elements in a channel frequency response vector $\underline{h}_{b_1}$ (which is a column of the matrix $\underline{H}$) to derive $N_R$ interference components. The interference components $\underline{i}^1$ are then subtracted from the first stage's input symbol streams $\underline{y}^1$ to derive $N_R$ modified symbol streams (denoted as a vector $\underline{y}^2$), which include all but the subtracted (i.e., cancelled) interference components. The $N_R$ modified symbol streams are then provided to the next stage.

For each of the second through last stages 610b through 610t, the spatial processor for that stage receives and processes the $N_R$ modified symbol streams from the interference canceller in the preceding stage to derive the detected symbol streams for that stage. For each stage, the detected symbol stream associated with the best metric is selected and processed by the RX data processor to provide the corresponding decoded data stream. For each of the second through second-to-last stages, the interference canceller in that stage receives the $N_R$ modified symbol streams from the interference canceller in the preceding stage and the decoded data stream from the RX data processor within the same stage, derives the $N_R$ interference components due to the symbol stream recovered by that stage, and provides $N_R$ modified symbol streams for the next stage.

The successive interference cancellation receiver processing technique is described in further detail in the aforementioned U.S. patent application Ser. Nos. 09/993,087 and 09/854,235.

The spatial processor 620 in each stage implements a particular spatial or space-time receiver processing technique. The specific receiver processing technique to be used is typically dependent on the characteristics of the MIMO channel, which may be characterized as either non-dispersive or dispersive. A non-dispersive MIMO channel experiences flat fading (i.e., approximately equal amount of attenuation across the system bandwidth), and a dispersive MIMO channel experiences frequency-selective fading (e.g., different amounts of attenuation across the system bandwidth).

For a non-dispersive MIMO channel, spatial receiver processing techniques may be used to process the received signals to provide the detected symbol streams. These spatial receiver processing techniques include a channel correlation matrix inversion (CCMI) technique (which is also referred to as a zero-forcing technique) and a minimum mean square error (MMSE) technique. Other spatial receiver processing techniques may also be used and are within the scope of the invention.

For a dispersive MIMO channel, time dispersion in the channel introduces inter-symbol interference (ISI). To improve performance, a receiver attempting to recover a particular transmitted symbol stream would need to ameliorate both the interference (or "crosstalk") from the other transmitted symbol streams as well as the ISI from all symbol streams. To combat both crosstalk and ISI, space-time receiver processing techniques may be used to process the received symbol streams to provide the detected symbol streams. These space-time receiver processing techniques include a decision feedback equalizer (DFE), a MMSE linear equalizer (MMSE-LE), a maximum-likelihood sequence estimator (MLSE), and so on.

The CCMI, MMSE, DFE, and MMSE-LE techniques are described in detail in the aforementioned U.S. patent application Ser. Nos. 09/993,087, 09/854,235, 09/826,481, and 09/956,44.

The techniques described herein for processing the received symbol streams to recover the transmitted symbol streams may be implemented by various means. For example, these techniques may be implemented in hardware, software, or a combination thereof. For a hardware implementation, the elements used to derive the metrics for the detected symbol streams and/or perform the successive interference cancellation processing may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, certain aspects of the symbol stream selection and successive interference cancellation processing may be implemented with modules (e.g., procedures, functions, and so on) that perform the functions described herein. The software codes may be stored in a memory unit (e.g., memory 172 in FIG. 1) and executed by a processor (e.g., controller 170). The memory unit may be implemented within the processor or external to the processor, in which case it can be communicatively coupled to the processor via various means as is known in the art.

Headings are included herein for reference and to aid in locating certain sections. These headings are not intended to limit the scope of the concepts described therein under, and these concepts may have applicability in other sections throughout the entire specification.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for processing a plurality of received symbol streams to recover a plurality of transmitted symbol streams, comprising:

processing the received symbol streams to provide a plurality of detected symbol streams, wherein each detected symbol stream is an estimate of a corresponding transmitted symbol stream;

determining a metric for each of the plurality of detected symbol streams as a function of a frequency selective response of one or more transmission channels used to transmit a detected symbol stream;

selecting the detected symbol stream associated with a best metric for recovery; and processing the selected detected symbol stream to recover a transmitted symbol stream and obtain data transmitted for the transmitted symbol stream.

2. The method of claim 1, further comprising:

deriving a plurality of modified symbol streams as a function of estimated interference due to the recovered transmitted symbol stream approximately removed; and processing the modified symbol streams to recover another transmitted symbol stream.

3. The method of claim 1, wherein the act of determining the metric for each detected symbol stream is a function of the overall channel capacity of the one or more transmission channels used to transmit the detected symbol stream.

4. The method of claim 1, wherein the act of determining the metric for each detected symbol stream is a function of an equivalent signal-to-noise-and-interference ratio (SNR) for an Additive White Gaussian Noise (AWGN) channel that models the one or more transmission channels used to transmit the detected symbol stream.

5. The method of claim 1, wherein the metric for each detected symbol stream is determined based on post-detection signal-to-noise-and-interference ratios (SNRs) of the one or more transmission channels used to transmit the detected symbol stream.

6. The method of claim 5, wherein the plurality of detected symbol streams corresponds to a plurality of data streams with same rates.

7. The method of claim 5, wherein the plurality of detected symbol streams corresponds to a plurality of data streams with a non-uniform distribution of rates.

8. The method of claim 7, wherein the metric for each detected symbol stream further considers a rate of a corresponding data stream.

9. The method of claim 7, wherein the metric for each detected symbol stream relates to a margin between a required signal-to-noise-and-interference ratio (SNR) and an equivalent SNR for an Additive White Gaussian Noise (AWGN) channel that models the one or more transmission channels used to transmit the detected symbol stream.

10. The method of claim 9, wherein the detected symbol stream with a highest margin is selected for recovery.

11. The method of claim 10, wherein the received symbol streams are processed based on spatial or space-time receiver processing to provide the plurality of detected symbol streams.

12. The method of claim 1, wherein the determining the metric for each detected symbol stream includes:
estimating a post-detection signal-to-noise-and-interference ratio (SNR) of each of the one or more transmission channels used to transmit the detected symbol stream;
determining a channel capacity of each transmission channel based on the post-detection SNR; and
accumulating channel capacities of the one or more transmission channels to obtain an overall channel capacity associated with the detected symbol stream;
wherein the detected symbol stream associated with a highest overall channel capacity is selected for recovery.

13. The method of claim 12, wherein the channel capacity of each transmission channel is determined based on an unconstrained capacity function.

14. The method of claim 12, wherein the channel capacity of each transmission channel is determined based on a constrained capacity function.

15. The method of claim 12, wherein the determining the metric for each detected symbol stream further includes:
determining an equivalent SNR for an Additive White Gaussian Noise (AWGN) channel based on the overall channel capacity associated with the detected symbol stream;
wherein the detected symbol stream associated with a highest equivalent SNR is selected for recovery.

16. The method of claim 1, wherein the method implements orthogonal frequency division multiplexing (OFDM).

17. The method of claim 16, wherein the determining the metric for each detected symbol stream includes:
estimating a post-detection signal-to-noise-and-interference ratio (SNR) of each frequency subchannel used to transmit the detected symbol stream;
determining a channel capacity of each frequency subchannel based on the post-detection SNR; and
accumulating channel capacities for all frequency subchannels used to transmit the detected symbol stream to obtain an overall channel capacity associated with the detected symbol stream;
wherein the detected symbol stream associated with a highest overall channel capacity is selected for recovery.

18. The method of claim 17, wherein the determining the metric for each detected symbol stream further includes:
determining an equivalent SNR for an Additive White Gaussian Noise (AWGN) channel based on the overall channel capacity associated with the detected symbol stream;
wherein the detected symbol stream associated with a highest equivalent SNR is selected for recovery.

19. The method of claim 16, wherein the plurality of transmitted symbol streams is derived for a plurality of transmitted data streams having same rates.

20. The method of claim 16, wherein the plurality of transmitted symbol streams is derived for a plurality of transmitted data streams having different rates.

21. The method of claim 1, wherein each of the plurality of transmitted symbol streams is transmitted on all frequency subchannels of a respective transmit antenna.

22. A method for processing a plurality of received symbol streams to recover a plurality of transmitted symbol streams, comprising:
processing the received symbol streams to provide a plurality of detected symbol streams;
determining a metric for each of the plurality of detected symbol streams as a function of a frequency selective response of a plurality of frequency subchannels used to transmit a detected symbol stream;
selecting the detected symbol stream associated with a best metric for recovery;
processing the selected detected symbol stream to recover a transmitted symbol stream and obtain data transmitted for the transmitted symbol stream;
deriving a plurality of modified symbol streams having estimated interference due to the recovered transmitted symbol stream approximately removed; and
processing the modified symbol streams to recover another transmitted symbol stream.

23. The method of claim 22, wherein the determining the metric for each detected symbol stream includes:
estimating a post-detection signal-to-noise-and-interference ratio (SNR) of each frequency subchannel used to transmit the detected symbol stream;
determining a channel capacity of each frequency subchannel based on the post-detection SNR; and
accumulating channel capacities for the plurality of frequency subchannels used to transmit the detected symbol stream to obtain an overall channel capacity associated with the detected symbol stream;
wherein the detected symbol stream associated with a highest overall channel capacity is selected for recovery.

24. The method of claim 23, wherein the act of determining the metric for each of the plurality of symbol streams further comprises determining a metric as a function of the frequency selective response of a subset of the plurality of frequency subchannels.

25. A method for deriving a metric indicative of a received quality of a symbol stream transmitted via a multipath channel, comprising:
estimating a post-detection signal-to-noise-and-interference ratio (SNR) of each of a plurality of frequency bins used to transmit the symbol stream;
determining a channel capacity of each frequency bin based on the post-detection SNR; and
accumulating channel capacities of the plurality of frequency bins to obtain an overall channel capacity indicative of the received quality of the symbol stream.

26. The method of claim 25, wherein the post-detection SNR is indicative of a received signal quality.

27. The method of claim 25, wherein the channel capacity of each frequency bin is determined based on an unconstrained capacity function.

28. The method of claim 25, wherein the channel capacity of each frequency bin is determined based on a constrained capacity function.

29. The method of claim 25, further comprising:
determining an equivalent SNR for an Additive White Gaussian Noise (AWGN) channel based on the overall channel capacity, wherein the equivalent SNR is indicative of the received quality of the symbol stream.

30. The method of claim 29, further comprising:
determining a required SNR for the symbol stream; and
determining a margin between the required SNR and the equivalent SNR as the metric for the symbol stream.

31. The method of claim 29, wherein the metric is used to select a specific detected symbol stream at a particular stage of a successive interference cancellation receiver for recovery.

32. A digital signal processing device (DSPD) capable of interpreting digital information to:
process a plurality of received symbol streams to provide a plurality of detected symbol streams, wherein each detected symbol stream is an estimate of a corresponding transmitted symbol stream;
determine a metric for each detected symbol stream, wherein the metric considers a frequency selective response of one or more transmission channels used to transmit a detected symbol stream;
select the detected symbol stream associated with a best metric for recovery;
process the selected detected symbol stream to recover a transmitted symbol stream and obtain data transmitted for the transmitted symbol stream;
derive a plurality of modified symbol streams having estimated interference due to the recovered transmitted symbol stream approximately removed; and
process the modified symbol streams to recover another transmitted symbol stream.

33. An apparatus, comprising:
means for processing a plurality of received symbol streams to provide a plurality of detected symbol streams;
means for determining a metric for each detected symbol stream, wherein the metric is a function of a frequency selective response of one or more transmission sub-channels used to transmit a detected symbol stream;
means for selecting the detected symbol stream associated with a best metric for recovery; and
means for processing the selected detected symbol stream to recover the a transmitted symbol stream and obtain data transmitted for the transmitted symbol stream.

34. The apparatus of claim 33, further comprising:
means for deriving a plurality of modified symbol streams having estimated interference from the recovered transmitted symbol stream approximately removed; and
means for processing the modified symbol streams to recover another transmitted symbol stream.

35. The apparatus of claim 33, further comprising:
means for estimating a post-detection signal-to-noise-and-interference ratio (SNR) of each of the one or more transmission sub-channels used to transmit the detected symbol stream;
means for determining a channel capacity of each transmission sub-channel based on the post-detection SNR; and
means for accumulating channel capacities of the one or more transmission sub-channels to obtain an overall channel capacity associated with the detected symbol stream;
wherein the detected symbol stream associated with a highest overall channel capacity is selected for recovery.

36. The apparatus of claim 33, wherein the plurality of detected symbol streams correspond to a plurality of data streams with same rates.

37. The apparatus of claim 33, wherein the plurality of detected symbol streams correspond to a plurality of data streams with a non-uniform distribution of rates.

38. The apparatus of claim 37, wherein the metric for each detected symbol stream further considers a rate of a corresponding data stream.

39. A receiver unit in a wireless communication system, comprising:
a spatial processor operative to process a plurality of received symbol streams based on successive interference cancellation (SIC) processing, wherein for each stage of the SIC processing, to perform processing on a plurality of input symbol streams for a stage to provide one or more detected symbol streams, wherein the input symbol streams for a first stage are the received symbol streams, and wherein each detected symbol stream is an estimate of a corresponding transmitted symbol stream;
a data processor operative to, for each stage of the SIC processing, process a selected detected symbol stream to recover a transmitted symbol stream and obtain data transmitted for the transmitted symbol stream; and
a controller operative to, for each stage of the SIC processing except for a last stage, determine a metric for each of a plurality of detected symbol streams, select a detected symbol stream associated with a best metric for recovery in the stage, and provide an indication of the selected detected symbol stream for the stage, wherein the metric for each detected symbol stream is a function of a frequency selective response of one or more transmission channels used to transmit the detected symbol stream.

40. The receiver unit of claim 39, wherein the controller is further operative to determine the metric, for each detected symbol stream by receiving an estimated post-detection signal-to-noise-and-interference ratio (SNR) of each of the one or more transmission channels used to transmit the detected symbol stream, determine a channel capacity of each transmission channel based on the estimated post-detection SNR, and accumulate channel capacities of the one or more transmission channels to obtain an overall channel capacity associated with the detected symbol stream.

41. The receiver unit of claim 39, wherein the plurality of detected symbol streams for each stage except for the last stage corresponds to a plurality of data streams with same rates.

42. The receiver unit of claim 39, wherein the plurality of detected symbol streams for each stage except for the last stage corresponds to a plurality of data streams with a non-uniform distribution of rates.

43. The receiver unit of claim 39, wherein the metric for each detected symbol stream further considers a rate of a corresponding data stream.

* * * * *